(12) United States Patent
Hanes et al.

(10) Patent No.: US 7,471,871 B2
(45) Date of Patent: Dec. 30, 2008

(54) INDEX VALIDATION SYSTEM AND METHOD

(75) Inventors: David H. Hanes, Loveland, CO (US); John M. Main, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1175 days.

(21) Appl. No.: 10/649,509

(22) Filed: Aug. 25, 2003

(65) Prior Publication Data

US 2005/0050062 A1    Mar. 3, 2005

(51) Int. Cl.
G11B 27/00    (2006.01)

(52) U.S. Cl. ......................................................... 386/52

(58) Field of Classification Search .................. 386/46, 386/52–55, 68, 122; 707/100; 345/327, 345/328
See application file for complete search history.

(56) References Cited

U.S. PATENT DOCUMENTS

| 6,144,391 | A  | * | 11/2000 | Hinson et al. ............... 345/540 |
| 6,278,446 | B1 | * | 8/2001  | Liou et al. ................... 715/700 |
| 6,310,625 | B1 | * | 10/2001 | Yoshio et al. ............... 345/473 |
| 6,628,889 | B2 | * | 9/2003  | Inoue ........................... 386/52 |
| 2002/0024892 | A1 | | 2/2002 | Ando et al. |
| 2002/0039480 | A1 | | 4/2002 | Ando et al. |
| 2002/0083468 | A1 | | 6/2002 | Dudkiewicz |

* cited by examiner

*Primary Examiner*—Thai Tran
*Assistant Examiner*—Mishawn Dunn

(57) ABSTRACT

An index validation system comprises a processor and a validator accessible by the processor. The validator is adapted to access index data corresponding to video data and validate the index data after editing of the video data.

36 Claims, 3 Drawing Sheets

INDEX VALIDATION SYSTEM AND METHOD

TECHNICAL FIELD OF THE INVENTION

The present invention relates generally to video processing systems and, more specifically, to an index validation system and method.

BACKGROUND OF THE INVENTION

Consumers have responded favorably to the proliferation of optical storage media such as Digital Versatile Discs (DVDs) by outfitting their own personal computers (PCs) with video authoring and video creation software. DVDs provide several advantages over conventional media, e.g., VHS videotape, such as media longevity and size. Moreover, DVDs enable users to quickly jump to particular scenes in video, in sharp contrast to videotape technology, which only enables sequential or linear access.

Conventional systems and methods enable a user to jump to a particular scene by creating and recording a DVD with indexing information. A DVD video player then may use this index information to determine where the desired scene begins. As one example, authoring software such as MYDVD enables this scene index to be created while capturing analog and/or digital video. For example, MYDVD utilizes a time-based algorithm that creates a scene index as established by a user, e.g., every five minutes or every thirty seconds of playable video data. As consumers have become more sophisticated, they have begun to perform their own video-editing tasks. These consumers may use software such as SHOWBIZ, available from ArcSoft, Incorporated to perform editing such as deleting unwanted scenes, adding text or music and adding transitions between scenes. Unfortunately, such editing renders the originally-created index information invalid.

SUMMARY OF THE INVENTION

An index validation system comprises a processor and a validator accessible by the processor. The validator is adapted to access index data corresponding to video data and validate the index data after editing of the video data.

An index validation method comprises accessing index data for video data prior to editing of the video data and accessing the video data after editing. The method also comprises validating, via a processor, the index data for the video data after editing of the video data.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE DRAWINGS

Figure 1:
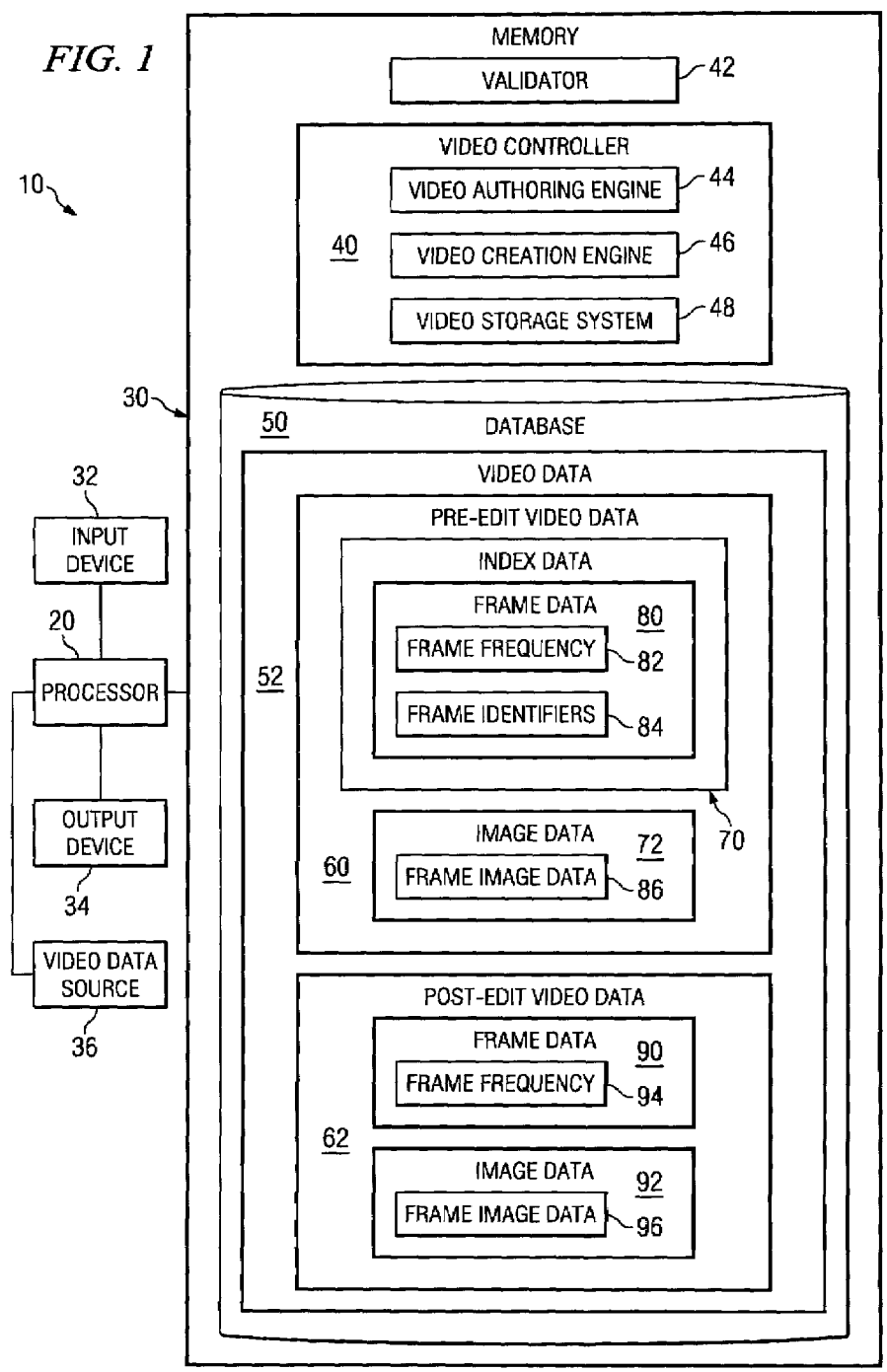
FIG. 1 is a block diagram of an embodiment of an index validation system in accordance with the present invention.

FIG. 1 is a block diagram illustrating an embodiment of an index validation system 10 in accordance with the present invention. Briefly, system 10 automatically validates index information corresponding to digital versatile disc (DVD) information. For example, system 10 automatically determines whether an index corresponding to particular video information on the DVD remains valid after editing of the video information.

In the embodiment illustrated in FIG. 1, system 10 comprises a processor 20, a memory 30, an input device 32, an output device 34, and a video data source 36. Processor 20 may comprise a computer, workstation, server, mini-computer, or other device having processing capabilities. Memory 30 may comprise cache, random access memory (RAM), or other types of memory resources for storing all or a portion of computer programs or routines and/or temporarily or permanently storing video or other types of information during various processes performed by system 10. All or a portion of memory 30 may be remotely or locally disposed relative to processor 20 to be accessible by processor 20. Input device 32 may comprise a keypad, mouse, pointing device, or other type of device for inputting information into system 10. Output device 34 may comprise a printer, monitor, graphical interface, or other type of device for generating an output via system 10.

Video data source 36 may comprise any device used to provide video information to system 10. For example, video data source 36 may provide video information from a variety of storage media such as video tape, disc, or a source that may produce video information continuously or "on the fly." Thus, video data source 36 may comprise a digital and/or analog video camera or recorder, a video cassette recorder (VCR), or other source of video information such as, but not limited to, streamed data from the Internet. The video information provided by video data source 36 may be digital video information, analog video information, or a combination of digital and analog video information. Analog video information may be digitized into a digital video information stream and may be received from a wide range of analog video transmission systems. Additionally, analog video information may be available in any of a variety of formats. Digital video information may be organized or formatted in any of a wide variety of formats or standards such as, but not limited to, moving pictures experts group (MPEG), joint photographic experts group (JPEG), or video object format (VOB). Digital video information received from video data source 36 may be uncompressed or compressed according to respective compression formats.

The present invention also contemplates computer software that may be stored in memory 30 as to be accessible and/or executable by processor 20. For example, in the embodiment illustrated in FIG. 1, system 10 comprises a video controller 40 and a validator 42. Video controller 40 and validator 42 may. comprise software, hardware, or a combination of software and hardware. In the embodiment illustrated in FIG. 1, video controller 40 and validator 42 are illustrated as being stored in memory 30 so as to be accessible and executable by processor 20. However, video controller 40 and validator 42 may be otherwise stored, even remotely, so as to be accessible by processor 20. Additionally, video controller 40 and/or validator 42 may be loaded into memory 30 from a computer readable medium such as, but not limited to, a diskette, DVD, compact disc, or other type of removable medium. Thus, video controller 40 and/or validator 42 may be individually distributed.

Briefly, video controller 40 may be used to create, edit, and/or store video information received from video data source 36 or other communication mediums. For example, in the embodiment illustrated in FIG. 1, video controller 40 comprises a video authoring engine 44, a video creation engine 46, and a video storage system 48. Video authoring engine 44, video creation engine 46, and video storage system 48 may comprise software, hardware, or a combination of software and hardware. Video authoring engine 44 may be used to edit, modify, or otherwise alter video information stored in memory 30 or otherwise received from video data source 36. Video creation engine 46 may be used to create video information to be stored in memory 30 or otherwise stored. For example, video creation engine 46 may be used to generate a video file in digital format from analog video information such as, but not limited to, video camera or VHS tapes. Video storage system 48 may be used to store video information in a desired format on a variety of types of media such as, but not limited to, optical media, including compact discs and DVDs. Video storage system 48 may also be used to compress or decompress video information corresponding to a particular compression and/or decompression scheme.

In the embodiment illustrated in FIG. 1, system 10 also comprises a database 50 having video data 52 associated with a particular source of video information. For example, in the illustrated embodiment, video data 52 comprises pre-edit video data 60 and post-edit video data 62. Pre-edit video data 60 comprises information associated with a particular video file before editing of the video file using video authoring engine 44 or other video editing software. For example, in the illustrated embodiment, pre-edit video data 60 comprises index data 70 and image data 72. Index data 70 comprises information associated with an index of a particular video file. For example, index data 70 may comprise information such as, but not limited to, pointers, flags, or other identifiers for identifying particular frames of the video file used as or forming the index for the video file. For example, index data 70 may comprise frame data 80 having information associated with the various frames of the video file forming the index for the video file. In the illustrated embodiment, frame data 80 comprises a frame frequency 82 and frame identifiers 84. Frame frequency 82 comprises information associated with a particular frequency for the frames forming the index for the video file. For example, the index for a particular video file may be time-based, scene-based, or may be based on other types of index schemes. Frame frequency 82 may comprise information identifying a particular quantity of frames between each indexed frame, thereby indicating a pre-determined time-based frequency for the index. Frame identifiers 84 may comprise information associated with a scene-based indexing scheme. For example, frame identifiers 84 may comprise flags, pointers, or other indicators identifying particular frames of the video file forming the index.

Image data 72 comprises information associated with the images forming or otherwise comprising a particular video file. Image data 72 may also comprise frame image data 86 having information associated with the particular frames of the video file forming the index. For example, frame image data 86 may comprise pixel information and other types of visual data corresponding to the particular frames of the video file forming the index. Index data 70 and/or image data 72 may be determined by validator 42 by analyzing the pre-edit video file or may be retrieved directly from the pre-edit video file. For example, in one embodiment, index data 70 and/or image data 72 may reside or be stored as a data file on the pre-edit video file such that validator 42 may retrieve the file contents and store the information in database 50. In another embodiment, validator 42 may evaluate the pre-edit video file to determine the index data 70 and/or image data 86.

In the embodiment illustrated in FIG. 1, post-edit video data 62 comprises frame data 90 and image data 92. Frame data 90 comprises information associated with frames of the video file after editing of the video file as indicated or identified by index data 70. For example, frame data 90 may comprise information associated with particular frames of the post-edit video file as indicated or identified by index data 70. Thus, frame data 90 comprises information identifying particular frames of post-edit video data 62 forming the index for the edited video file using flags or pointers from the pre-edit index of the video file. As illustrated in FIG. 1, frame data 90 also comprises a frame frequency 94 having information associated with a time-based frequency of frames corresponding to the post-edit video data 62 index. For example, after editing of a particular video file, the quantity of frames between indexed frames of the video file may be different than the quantity of frames between indexed frames for pre-edit video data 60. Thus, frame frequency 94 may comprise information identifying different frame frequencies between indexed frames or information indicating an absence of a consistent quantity of frames between indexed frames.

Image data 92 comprises information associated with the images corresponding to post-edit video data 62. For example, image data 92 may comprise information corresponding to the sequence of images forming the video file after editing. Image data 92 may also comprise frame image data 96 having information associated with the frames of post-edit video data 62 forming the index for the edited video file. For example, index data 70 may comprise pointers or flags identifying particular frame numbers of the pre-edit video file as index frames. However, after editing of the video file, the corresponding frames of the post-edit video file as indicated by the flags or pointers may be different than the pre-edit index frames. Thus, based on the index data 70 flags or pointers, corresponding frames of both the pre-edit video file and the post-edit video file that would form the index based on pre-edit index information may be evaluated or compared. It should be understood that a variety of methods or techniques may be used to identify and compare corresponding frame information of the pre-edit video file and the post-edit video file based on the pre-edit index information.

Briefly, system 10 automatically validates index data 70 for post-edit video data 62. For example, as described above, index data 70 comprises information associated with an index or menu identifying various frames of pre-edit video data 60 so that a user may select particular frames of the index or menu, thereby enabling access to portions of pre-edit video data at desired locations within the video data 60. System 10 automatically determines whether index data 70 corresponding to pre-edit video data 60 remains valid after editing of the pre-edit video data 60.

In operation, according to one embodiment, validator 42 performs various video pre-edit and post-edit operations to enable a comparison of pre-edit and post-edit video information to validate the pre-edit index of the video. For example, according to one embodiment, in response to an edit request by a user of system 10, validator 42 automatically obtains index data 70 corresponding to pre-edit video data 60. As will be described below, validator 42 may employ a variety of techniques to determine whether index data 70 remains valid for post-edit video data 62. For example, according to one embodiment, validator 42 may automatically determine an indexing scheme for pre-edit video data 60. In this embodiment, validator 42 may determine a frame frequency 82 for index data 70 by determining whether a relatively consistent or equal quantity of frames reside on pre-edit video data 60 between indexed frames of pre-edit video data 60 as identified by index data 70. If a relatively consistent or equal quantity of frames reside on pre-edit video data 60 between each indexed frame of pre-edit video data 60, validator 42 may determine that index data 70 defines a time-based indexing scheme for pre-edit video data 60. If validator 42 determines that a generally inconsistent quantity of frames reside on pre-edit video data 60 between each indexed frame of pre-edit video data 60, validator 42 may determine that index data 70 defines a scene-based indexing scheme. To determine a time-based indexing scheme, validator 42 may evaluate a quantity of frames residing between indexed frames or determine the frequency of an indexed frame while playing the video file at a particular speed. Thus, based on the type of indexing scheme used for index data 70, validator 42 may determine a preferred method of index data 70 evaluation corresponding to post-edit video data 62.

If validator 42 determines that index data 70 defines a time-based indexing scheme, validator 42 may compare frame frequency 94 of post-edit video data 62 with frame frequency 82 of pre-edit video data 60. For example, in a time-based indexing scheme, the quantity of frames between indexed frames remains generally constant. Thus, in operation, index data 70 identifies particular frames of pre-edit video data 60 as the indexed frames. Validator 42 identifies the frames of post-edit video data 62 corresponding to the index pointers of index data 70 and determines frame frequency 94 for post-edit video data 62. If frame frequency 94 is different than frame frequency 82, validator 42 may determine that index data 70 is invalid for post-edit video data 62.

If validator 42 determines that index data 70 defines a scene-based indexing scheme, validator 42 may compare information associated with the indexed frames of pre-edit video data 60 with frames of post-edit video data 62 to determine whether index data 70 remains valid for post-edit video data 62. For example, in operation, frame identifiers 84 may comprise pointers, flags, or other types of identification information identifying various frames of pre-edit video data 60 as the indexed frames. Correspondingly, frame image data 86 may comprise image information corresponding to the indexed frames. For example, frame image data 86 may comprise pixel information, histogram information, vector information, or other visual information relating to the indexed frames of pre-edit video data 60. Thus, in operation, validator 42 identifies frames of post-edit video data 62 as indicated by frame identifiers 84 and compares frame image data 96 of post-edit video data 62 with frame image data 86 corresponding to pre-edit video data 60. For example, validator 42 may perform a histogram analysis or other type of image analysis to determine whether the indexed images in the corresponding frames have changed between post-edit video data 62 and pre-edit video data 60. If validator 42 determines that the image information of the indexed frames of post-edit video data 62 as identified by frame identifiers 84 is different than image information corresponding to the corresponding index frame of pre-edit video data 60, validator may determine that index data 70 is invalid for post-edit video data 62.

Validator 42 may also evaluate the quantity of frames indexed for post-edit video data 62 as indicated by frame identifiers 84 with the quantity of indexed frames of pre-edit video data 60. For example, index data 70 may identify a particular quantity of frames indexed for pre-edit video data 60 as identified by frame identifiers 84 or as a result of frame frequency 82. However, after editing, video data 62 may comprise a different quantity of indexed frames using frame frequency 82 or frame identifiers 84. Thus, validator 42 may compare the quantity of indexed frames for post-edit video data 62 with a quantity of indexed frames for pre-edit video data 60 to determine whether index data 70 remains valid for post-edit video data 62.

Figure 2:
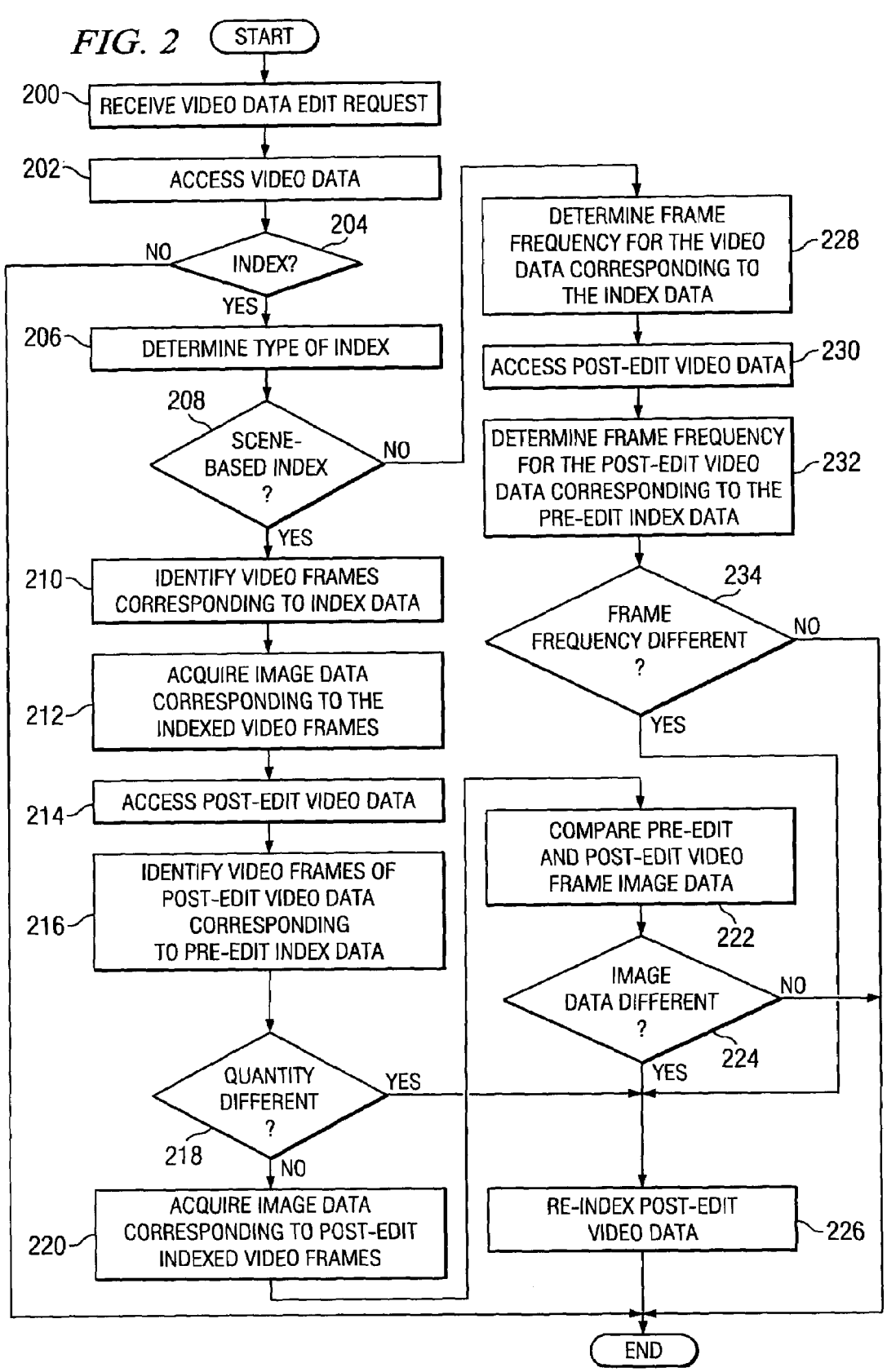
FIG. 2 is a flow diagram illustrating an embodiment of an index validation method in accordance with the present invention.

FIG. 2 is a flowchart illustrating an embodiment of an index validation method in accordance with the present invention. The method begins at block 200, where system 10 receives an edit request from a user. At block 202, validator 42 accesses video data 52 corresponding to the edit request. At decisional block 204, validator automatically determines whether the corresponding video data 52 comprises an index. If the requested video data 52 does comprise an index, the method proceeds to block 206, where validator 42 automatically determines the type or scheme of the index. For example, as described above, validator 42 may automatically determine whether the indexing scheme for video data 60 comprises a time-based indexing scheme, a scene-based indexing scheme, or another type of indexing scheme.

At decisional block 208, a determination is made whether index data 70 corresponding to video data 60 comprises a scene-based indexing scheme. If index data 70 identifies a scene-based indexing scheme, the method proceeds to block 210, where validator 42 automatically identifies the video frames corresponding to index data 70. For example, as described above, validator 42 may access frame identifiers 84 or other types of indicators identifying the frames of the index for pre-edit video data 60. At block 212, validator 42 acquires frame image data 86 corresponding to the indexed frames. At block 214, validator 42 accesses post-edit video data 62. At block 216, validator 42 identifies frames of post-edit video data 62 corresponding to frame identifiers 84. For example, as described above, validator 42 may use flags or pointers based on pre-edit index data 70 to identify corresponding frames of the post-edit video file. Thus, if pre-edit index data 70 identifies frame 400 as an indexed frame of the pre-edit video file, validator 42 may identify frame 400 of the post-edit video file to enable a comparison of pre-edit and post-edit frames 400.

At decisional block 218, a determination is made whether the quantity of indexed frames of post-edit video data 62 differs from the quantity of indexed frames of pre-edit video data 60. If the quantity of index frames differs between post-edit video data 62 and pre-edit video data 60, the method proceeds from block 218 to block 226, where validator 42 initiates re-indexing of post-edit video data 62 corresponding to the previously identified indexing scheme or another type of indexing scheme as indicated by the user. If the quantity of indexed frames does not differ between post-edit video data 62 and pre-edit video data 60, the method proceeds from block 218 to block 220, where validator 42 automatically acquires frame image data 96 for the indexed frames of post-edit video data 62 as identified using frame identifiers 84.

At block 222, validator 42 compares frame image data 86 with frame image data 96 for corresponding indexed frames. At decisional block 224, a determination is made whether image data 96 differs from image data 86 for at least one corresponding indexed frame of post-edit video data 62 and pre-edit video data 60. If the image data 96 does not differ from image data 86 or corresponding frames, the method ends. If frame image data 96 differs from frame image data 86 for at least one index frame, the method proceeds from block 224 to block 226, where validator 42 initiates, either automatically or at the request of a user, re-indexing of post-edit video data 62 corresponding to the previously identified indexing scheme or another indexing scheme as indicated by the user.

At block 208, if validator 42 determines that index data 70 or pre-edit video data 60 does not indicate a scene-based indexing scheme, the method proceeds from block 208 to block 228, where validator 42 determines frame frequency 82 for pre-edit video data 60. At block 230, validator 42 accesses post-edit video data 62. At block 232, validator 42 determines frame frequency 94 for post-edit video data 62 using frame identifiers 84 as indicated by pre-edit index data 70. At decisional block 234, validator 42 compares frame frequencies 94. If frame frequencies 94 and 82 differ, the method proceeds to block 226, where validator 42 automatically initiates re-indexing of post-edit video data 62. If frame frequencies 94 and 82 do not differ, the method ends.

Figure 3:
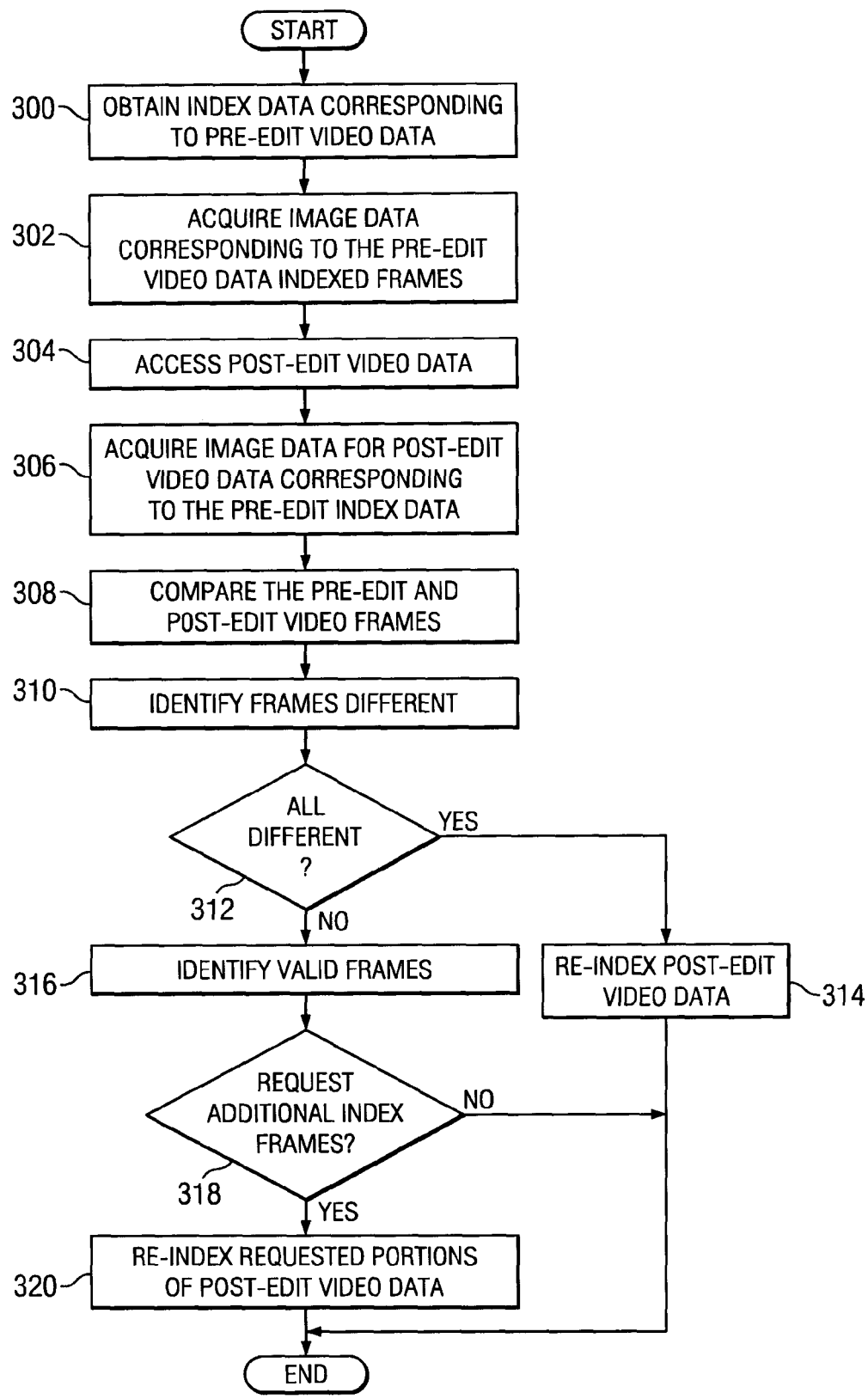
FIG. 3 is a flow diagram illustrating another embodiment of an index validation method in accordance with the present invention.

FIG. 3 is a flowchart illustrating another embodiment of an index validation method in accordance with the present invention. The method begins at block 300, where validator 42 obtains index data 70 corresponding to pre-edit video data 60. At block 302, validator 42 acquires frame image data 86 corresponding to the indexed frames of pre-edit video data 60. At block 304, validator 42 accesses post-edit video data 62.

At block 306, validator 42 acquires frame image data 96 for post-edit video data 62 corresponding to frame identifiers 84 of index data 70. At block 308, validator 42 compares the indexed frames of post-edit video data 62 and pre-edit video data 60 using frame image data 96 and 86, respectively. For example, as described above, histogram or other types of image analysis techniques may be used to compare the frame images. At block 310, validator 42 identifies the indexed frames of post-edit video data 62 and pre-edit video data 60 that are different. At decisional block 312, validator 42 determines whether any indexed frames of post-edit video data 62 are different from indexed frames of pre-edit video data 60. If any indexed frames are different, the method proceeds from block 312 to block 314, where validator 42 initiates, either automatically or at the request of a user, re-indexing of post-edit video data 62 corresponding to the indexing scheme indicated by index data 70 or another indexing scheme as identified by a user. If any indexed frames are not different, the method proceeds from block 312 to block 316, where validator 42 automatically identifies the valid indexed frames. At block 318, validator 42 may prompt the user via output device 34 or other means whether the user desires to identify additional frames for the index of post-edit video data 62. If the user does not desire to identify additional frames for the index of the post-edit video data 62, the method ends. If the user desires to identify additional frames for the index of post-edit video data 62, the method proceeds from block 318 to block 320, where validator 42 initiates re-indexing of portions of post-edit video data 62 corresponding to the users request.

Thus, embodiments of the present invention automatically validate index information for a video, such as video information contained on a DVD, after editing of the video. The present invention may be used to validate index information for a variety of indexing schemes, and may also automatically initiate re-indexing of the video in response to determining an invalid index for the post-edit video. It should be understood that in the described methods, certain steps may be omitted, combined, or accomplished in a sequence different than depicted in FIGS. 2 and 3. Also, it should be understood that the methods depicted may be altered to encompass any of the other features or aspects of the invention as described elsewhere in the specification.

What is claimed is:

1. An index validation system, comprising:
   a processor;
   a video authoring engine accessible by the processor for editing a frame of video data; and
   a validator accessible by the processor, wherein the validator accesses index data that includes information associated with an index of the video data and determines whether the index corresponding to the video data remains valid after editing of the video data by comparing the video data before editing and after editing.

2. The system of claim 1, wherein the validator is adapted to determine an indexing scheme for the video data.

3. The system of claim 1, wherein the validator is adapted to determine whether the index data defines a time-based indexing scheme for the video data by evaluating a quantity of frames residing between indexed frames.

4. The system of claim 1, wherein the validator is adapted to determine whether the index data defines a scene-based indexing scheme for the video data.

5. The system of claim 4, wherein the validator compares information associated with pre-edit indexed frames for the video data before editing with post-edit frames of the video data after editing to determine whether the index remains valid for the video data after editing.

6. The system of claim 1, wherein the validator is adapted to obtain image data for a frame of the video data identified by the index data before editing of the video data.

7. The system of claim 1, wherein the validator is adapted to obtain image data for a frame of the video data identified by the index data after editing of the video data.

8. The system of claim 1, wherein the validator is adapted to compare image data for a frame of the video data identified by index data before editing with a corresponding frame of the video data after editing of the video data.

9. The system of claim 1, wherein the validator is adapted to determine a frame frequency for the video data corresponding to the index data before editing of the video data.

10. The system of claim 1, wherein the validator is adapted to determine a frame frequency for the video data corresponding to the index data after editing of the video data.

11. The system of claim 1, wherein the validator is adapted to compare a pre-edit frame frequency for the video data before editing with a post-edit frame frequency for the video data after editing, the pre-edit and post-edit frame frequencies corresponding to the index data.

12. The system of claim 1, wherein the validator is adapted to initiate re-indexing of at least a portion of the video data in response to determining that at least a portion of the index data is invalid for the video data after editing.

13. The system of claim 1, wherein the validator is adapted to automatically initiate re-indexing of at least a portion of the video data in response to determining that at least a portion of the index data is invalid for the video data after editing.

14. The system of claim 1, wherein the validator determines a frame frequency for the index data by determining whether a relatively consistent or equal quantity of frames reside on the video data between indexed frames of the video data as identified by the index data.

15. The system of claim 1, wherein the validator is adapted to determine whether the index data defines a time-based indexing scheme for the video data by determining a frequency of an indexed frame while playing a corresponding video file at a particular speed.

16. An index validation method, comprising:
   accessing index data for video data prior to editing of the video data, the indexed data including information associated with an index of the video data;
   editing a frame of the video data;
   accessing the video data after editing; and
   determining, via a processor, whether the index corresponding to the video data remains valid after editing of the video data by comparing the video data before editing and after editing.

17. The method of claim 16, further comprising determining an indexing scheme for the video data from the index data.

18. The method of claim 16, further comprising obtaining image data corresponding to a frame of the video data identified by the index data before editing of the video data.

19. The method of claim 16, further comprising obtaining image data corresponding to a frame of the video data identified by the index data after editing of the video data.

20. The method of claim 16, wherein validating comprises comparing image data for a frame of the video data before editing of the video data as identified by the index data with a corresponding frame of the video data after editing of the video data.

21. The method of claim 16, further comprising determining whether the index data defines a time-based indexing scheme for the video data.

22. The system of claim 16, further comprising determining whether the index data defines a scene-based indexing scheme for the video data.

23. The system of claim 16, further comprising determining a frame frequency for the video data corresponding to the index data before editing of the video data.

24. The system of claim 16, further comprising determining a frame frequency for the video data corresponding to the index data after editing of the video data.

25. The system of claim 16, wherein validating comprises comparing a frame frequency for the video data before editing with a frame frequency for the video data after editing, the frame frequencies corresponding to the index data.

26. The system of claim 16, further comprising initiating re-indexing of at least a portion of the video data in response to determining that at least a portion of the index data is invalid for the video data after editing.

27. An index validation system, comprising:
means for accessing video data and index data that includes information associated with an index of the video data;
means for editing a frame of the video data; and
means for determining, via a processor, whether the index corresponding to the video data remains valid after editing of the video data by comparing the video data before editing and after editing.

28. The system of claim 27, wherein the validating means comprises means for determining an indexing scheme for the video data.

29. The system of claim 27, wherein the validating means comprises means for obtaining image data for a frame of the video data identified by the index data before editing of the video data.

30. The system of claim 27, wherein the validating means comprises means for obtaining image data for a frame of the video data identified by the index data after editing of the video data.

31. The system of claim 27, wherein the validating means comprises means for comparing image data for a frame of the video data as identified by the index data before editing of the video data with a corresponding frame of the video data after editing of the video data.

32. A computer-readable medium embodying a program of instructions executable by a processor to perform a method, the method comprising:
accessing video data and index data that includes information associated with an index of the video data;
editing a frame of the video data; and
determining whether index corresponding to the video data remains valid after editing of the video data by comparing the video data before editing and after editing.

33. The computer-readable medium of claim 32, the method comprising determining an indexing scheme for the video data from the index data.

34. The computer-readable medium of claim 32, the method comprising comparing image data for a frame of the video data before editing of the video data as identified by the index data with a corresponding frame of the video data after editing of the video data.

35. The computer-readable medium of claim 32, the method comprising determining an indexing scheme for the video data.

36. The computer-readable medium of claim 32, the method comprising initiating re-indexing of at least a portion of the video data in response to determining that at least a portion of the index data is invalid for the video data after editing.

* * * * *